UNITED STATES PATENT OFFICE 2,398,312

PROCESS FOR PRODUCING A TALL OIL OF LOW VISCOSITY AND FREE FROM CRYSTALLIZATION

William H. Jennings, Franklin, Va., assignor to Camp Manufacturing Company, Inc., Franklin, Va., a corporation of Virginia No Drawing. Application September 9, 1944, Serial No. 553,463

3 Claims. (Cl. 260—97.5)

This invention relates to a process for treating crude tall oil, having for its object to prevent crystallization upon standing, as well as to produce a tall oil of low viscosity.

Tall oil, as is well known, is a by-product in the manufacture of pulp from resinous woods by the sulphate process, tall oil being obtained by acidulating the black liquor skimmings obtained from the sulphate process.

The principal components of tall oil are fatty acids, resin acids, unsaponifiable matter, and a certain percentage of aqueous moisture. Tall oil does not have a constant composition, there being considerable variation in the relative ratio of the fatty and resin acids, dependent upon the wood used, the season of cutting, and other factors. A ratio of 65 parts of fatty acids to 35 parts of resin acids is typical for tall oil produced in Virginia. However, the resin acid content increases considerably in tall oil produced further south. The moisture content may vary from 1% to 5%, sometimes even higher.

Tall oil is subject to the defect, from the commercial standpoint, that its viscosity does not remain homogeneous under long standing, and a portion of its constituents crystallize out. For example, if a tank car of tall oil is left undisturbed for some time, the first batch drawn from the lower portion of the body of oil in the tank will be of higher viscosity and contain much crystalline matter, while successive batches drawn off at different times will have different characteristics. This phenomenon seriously limits the use of tall oil. At present, it is employed in soap making, as a substitute for linseed oil for paints, as a cutting oil, sheep dip, vehicle for insecticidal sprays, etc.

These uses would be materially extended and other uses developed if tall oil could be produced having a relatively low and homogeneous viscosity, free from crystallization and stabilized over a considerable time period.

Several patents have been issued covering the chemical refining of tall oil for specific purposes, but none of these, so far as known, have dealt with the problem of stabilizing the viscosity of the tall oil, so that the product made by these patented processes, although improved in one way or another, is still subject to objectionable crystallization and variations in its viscosity.

The instability of tall oil with respect to its viscosity is attributable to the resin acids content. The number of resin acids present is indeterminate, and up to the present time little is known about the chemistry of these acids.

I have discovered as the result of research that by selective polymerization of the resin acids present, both the crystallization and viscosity of tall oil can be controlled.

The selective treatment consists in treating crude tall oil after adjustment of its moisture content with sulphuric acid of 86% concentration the quantity of the acid employed being substantially 20% of the weight of the resin acids content of the tall oil.

It is quite critical that the sulphuric acid have a concentration of 86% when it is reacting with the resin acids. For practical results the reacting concentration of the sulphuric acid should not vary more than 1% above or below 86%. If it is materially stronger, polymerization appears to extend to a wider band of the resin acids, including some, the alteration of which causes increase in the viscosity of the tall oil. If it is materially weaker, practically no polymerization occurs.

It is obvious that since the reacting concentration of the sulphuric acid is so critical, the native moisture content of the crude tall oil (from 1% to 5% is a factor to be reckoned with, for if 86% sulphuric acid be added to tall oil in the stated proportions without control of the moisture content the acid will become too diluted to effect the desired polymerization. If the moisture content of a particular batch of tall oil be ascertained, and a proportionate amount of acid of stronger concentration than 86% be added to bring its concentration in the mixture to 86%, some polymerization of those resin acids which tend to increase the viscosity will take place before dilution is completed, producing indeterminate results. Furthermore, an excessive amount of acid is ordinarily required which may cause undesirable side reactions and increase the burden of recovery.

It has therefore been found practical to first reduce the moisture content of the tall oil to a negligible quantity, that is, not greater than one tenth of one percent (0.1%) and to add 86% sulphuric acid in the proportions above stated.

In order to prevent localized action, it is found advantageous to dilute the crude tall oil with an inert solvent such as benzene, petroleum ether or any other volatile hydrocarbon not affected by the sulphuric acid treatment before incorporating the sulphuric acid.

After treatment with the acid, the mixture is allowed to settle, and any precipitation formed is drained off. The treated tall oil is then washed with water to remove any free sulphuric acid that may be present. By using a concentrated solution of salt, salt cake, calcium chloride, etc., instead of plain water, the settling time is considerably shortened. After the wash water has been drained off, the treated tall oil—solvent mixture is then distilled to remove the solvent, and the finished tall oil is pumped to storage.

The product tall oil is characterized by having a lower viscosity than crude tall oil, by freedom from the tendency to crystallize on standing, and by having a stabilized homogeneous viscosity extending over a period of at least several months.

Example 10,000 pounds of tall oil with its moisture content reduced to less than .1% by raising the tall oil to a temperature above the boiling point of water, and containing 35% by weight of resin acids, is dissolved in approximately 1000 gallons of petroleum ether. 700 pounds of sulphuric acid of 86% concentration is added and the mixture agitated for one hour. It is then allowed to settle for two hours, and any precipitate is drawn off from the bottom. To the clear solution approximately 400 gallons of concentrated salt cake solution is added. The mixture is agitated for fifteen minutes, then allowed to settle until two distinct layers are formed. The bottom layer of wash water is then drained off. The top layer containing the tall oil and solvent is pumped to a still, where the solvent is removed by distillation, and may be reused. The tall oil remaining in the still is the finished product.

The temperature of the tall oil during the acid reaction step of the process should not exceed 40° C., as a higher temperature promotes undesirable side reactions.

What I claim as my invention is:

1. Process for producing a tall oil of low viscosity and free from crystallization comprising reducing the moisture content of the tall oil to not over one tenth of one percent the weight of the tall oil, and treating the tall oil with sulphuric acid of 86% concentration, the quantity of sulphuric acid being substantially 20% by weight of the resin acids content of the tall oil, until the polymerizing reaction of the sulphuric acid with the resin acids is completed the temperature of the tall oil during the reaction step being held within a range which does not materially exceed 40° C.

2. Process for producing a tall oil of low viscosity and free from crystallization comprising the following steps in the order given, reducing the moisture content of the tall oil to not over one tenth of one percent the weight of the tall oil, thinning the tall oil with an inert volatile solvent, treating the solution with sulphuric acid of 86% concentration the quantity of sulphuric acid being approximately 20% by weight of the resin acids content of the tall oil, to effect selective polymerization of certain of the resin acids, the temperature of the tall oil during the reaction step being held within a range not materially exceeding 40° C. washing out the residue free sulphuric acid, separating the wash water from the treated tall oil and distilling off the solvent.

3. Process of producing a tall oil of stabilized low viscosity and freedom from crystallization by the selective polymerization of a band of the resin acids content which are polymerized by reaction with sulphuric acid having a concentration within a range of from 85% to 87%, comprising, first controlling the acid concentration in the reaction zone by reducing the moisture content of the tall oil to a minimum not substantially exceeding one-tenth of one percent the weight of the tall oil, then reacting the tall oil with a quantity of sulphuric acid having a concentration of from 85% to 87% equal to approximately 20% of the resin acids content of the tall oil, until selective polymerization is completed, the temperature of the tall oil during the reaction step being held within a range which does not materially exceed 40° C.

WILLIAM H. JENNINGS.